Nov. 15, 1938.   C. B. MOORE ET AL   2,136,631
CONTROL APPARATUS
Filed Oct. 2, 1935   5 Sheets-Sheet 1
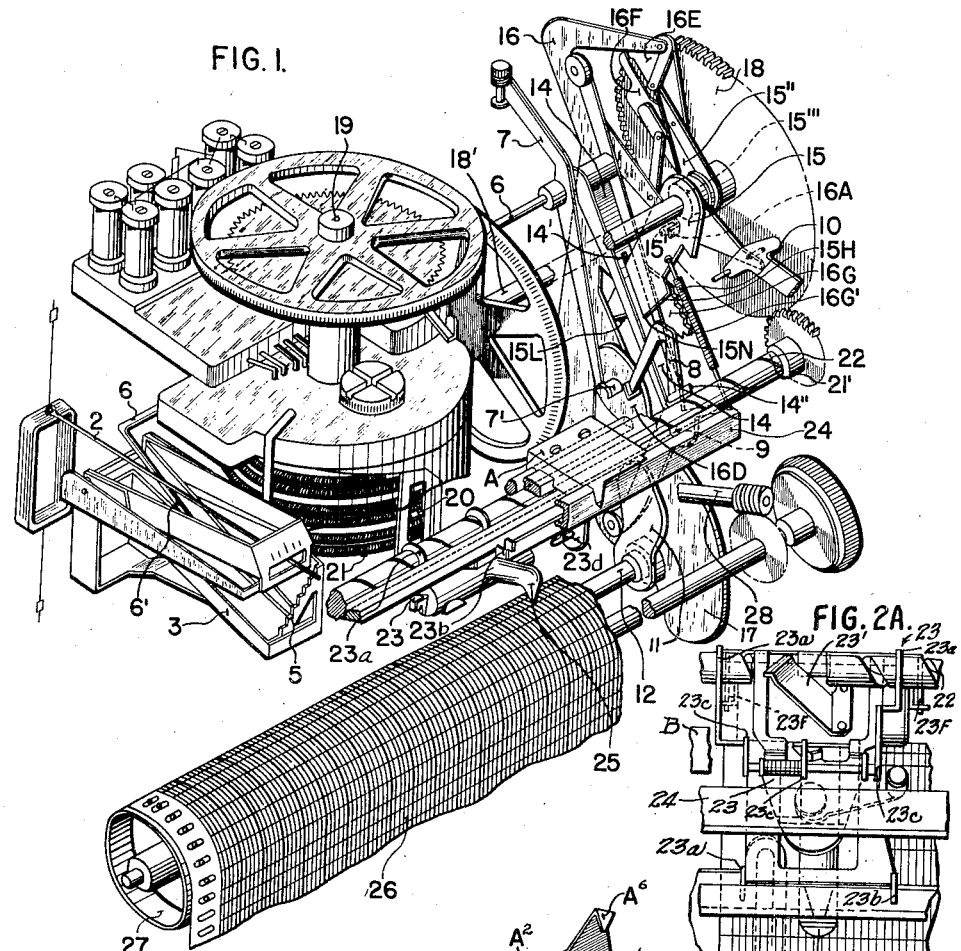
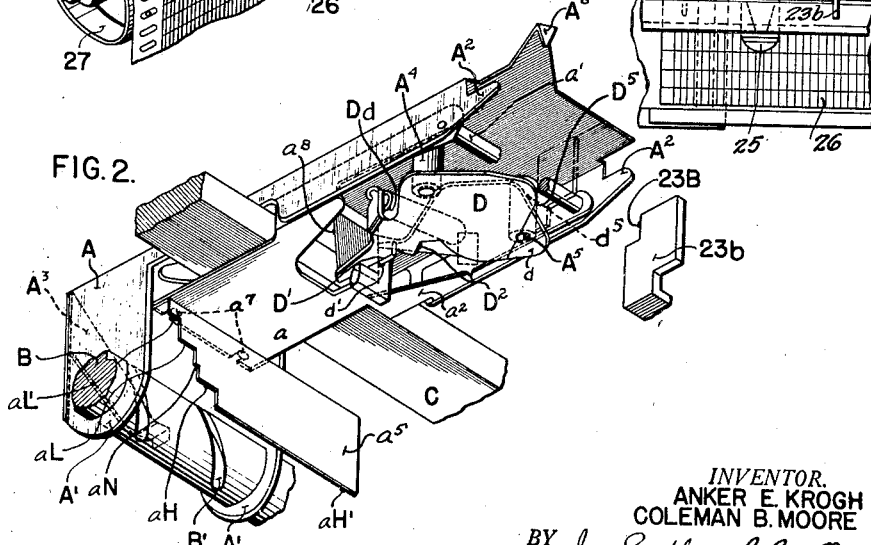
*INVENTOR.*
ANKER E. KROGH
COLEMAN B. MOORE
BY *J. E. Hubbell*
ATTORNEY Nov. 15, 1938.　　　C. B. MOORE ET AL　　　2,136,631
CONTROL APPARATUS
Filed Oct. 2, 1935　　　5 Sheets-Sheet 2

*INVENTOR.*
ANKER E. KROGH
COLEMAN B. MOORE
BY *J. E. Hubbell*
*ATTORNEY*

Nov. 15, 1938.  C. B. MOORE ET AL  2,136,631
CONTROL APPARATUS
Filed Oct. 2, 1935  5 Sheets-Sheet 4
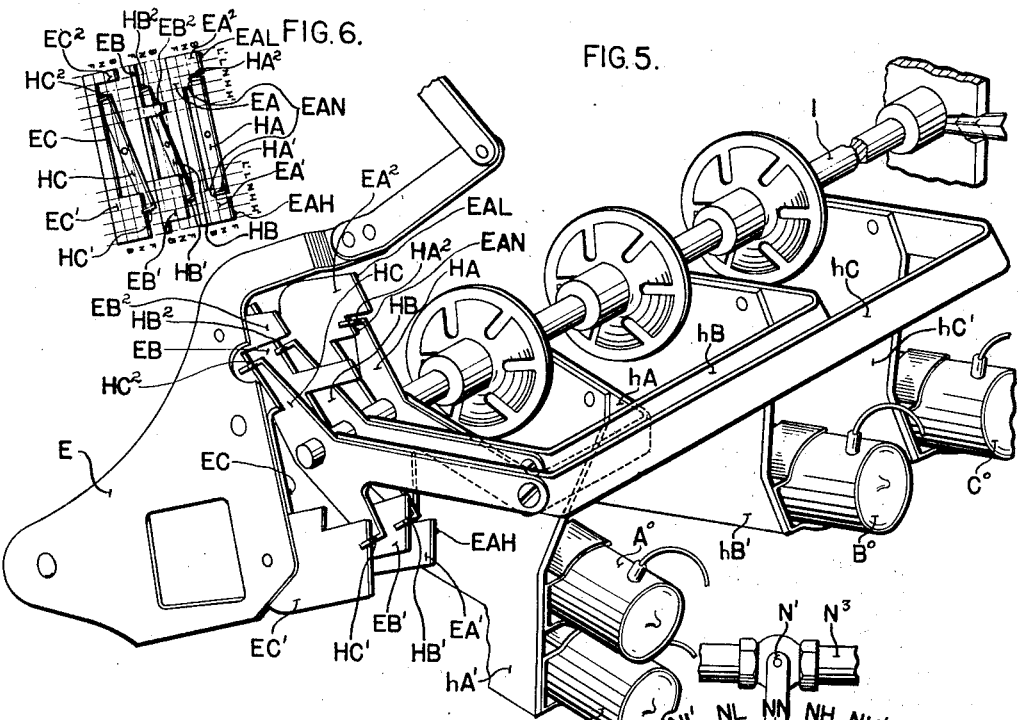
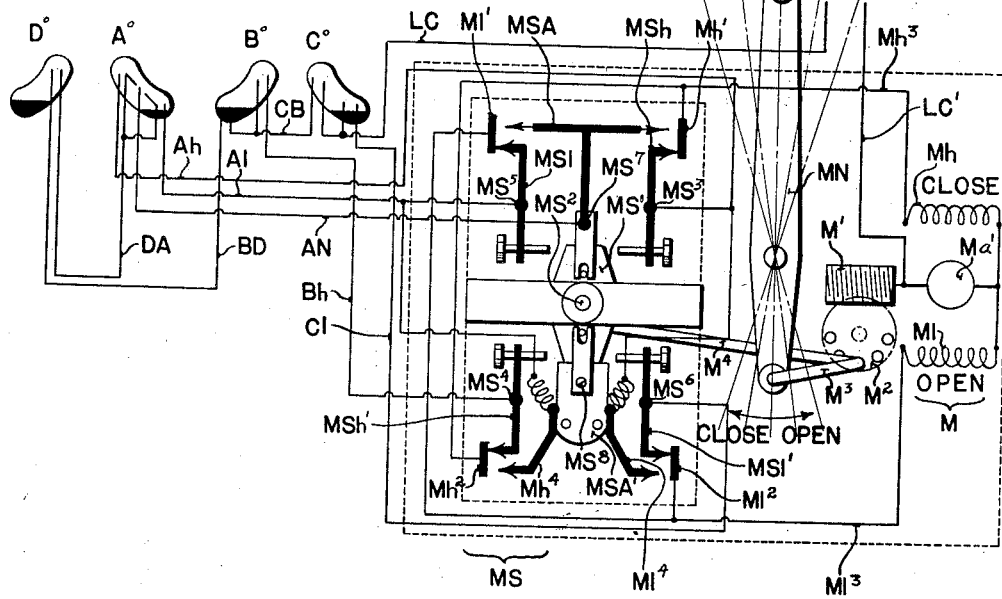
INVENTOR.
ANKER E. KROGH
COLEMAN B. MOORE
BY *J. E. Hubbell*
ATTORNEY

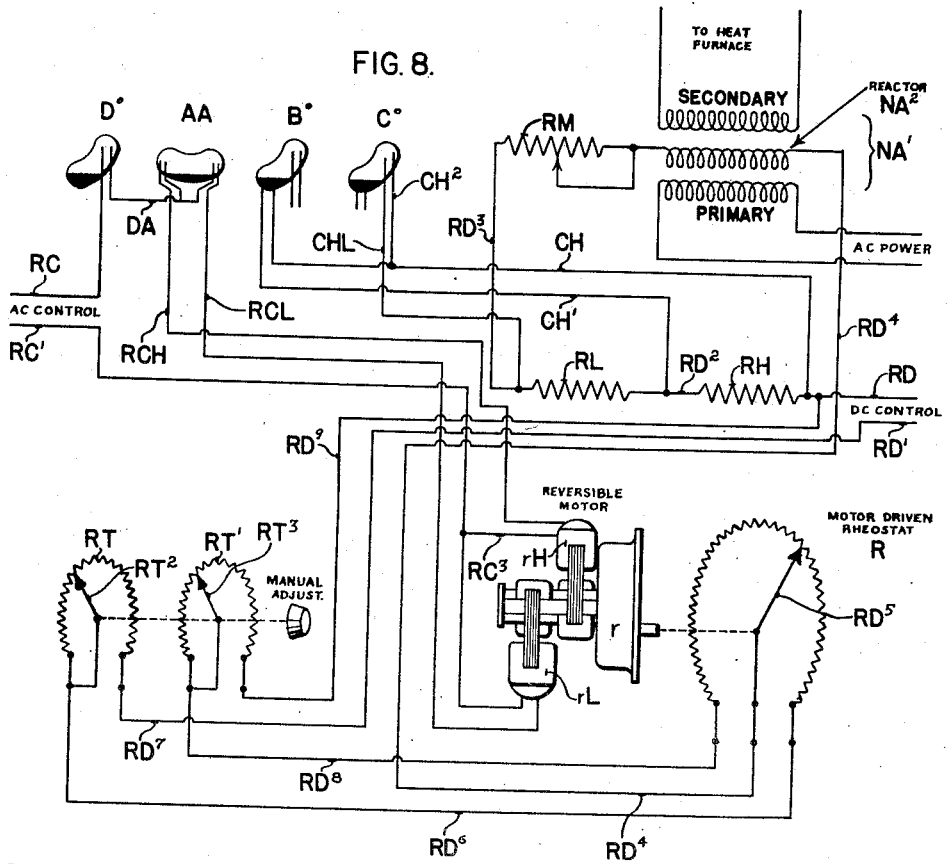
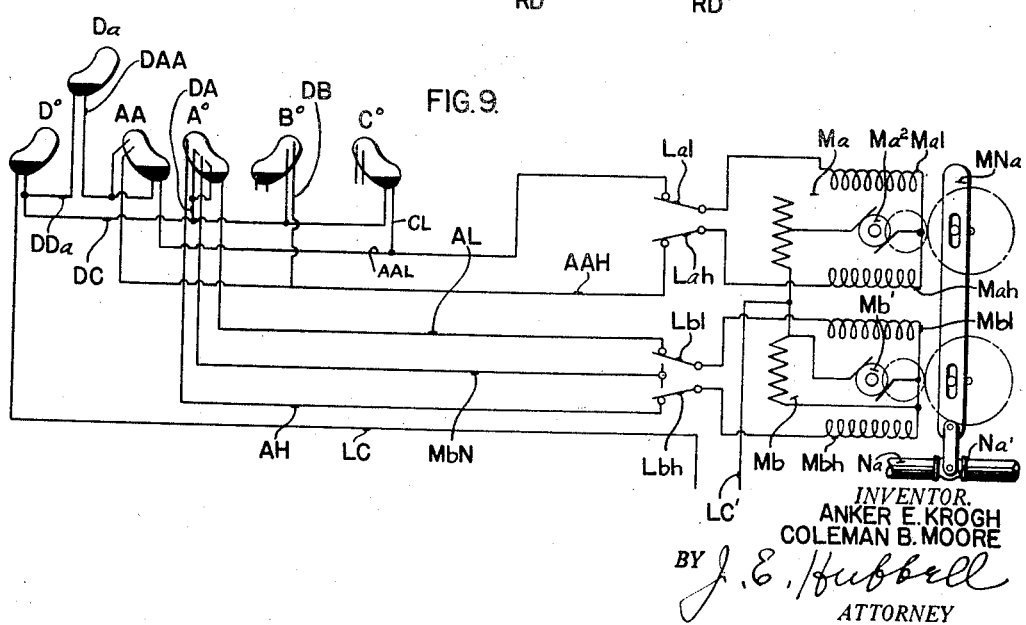

Patented Nov. 15, 1938

2,136,631

UNITED STATES PATENT OFFICE 2,136,631

CONTROL APPARATUS

Coleman B. Moore, Carroll Park, and Anker E. Krogh, Erdenheim, Pa., assignors to The Brown Instrument Company, Philadelphia, Pa., a corporation of Pennsylvania Application October 2, 1935, Serial No. 43,150

25 Claims. (Cl. 236—70)

This application relates to control apparatus and more particularly to control apparatus for controlling a variable condition, such as pressure, temperature, humidity, flow or the like, to maintain a predetermined value of said condition.

More particularly our invention relates to apparatus designed to effect control actuations in response to deviations of a deflecting meter element from a predetermined position and to set into operation in response thereto, agencies tending to return said element to said predetermined normal position.

Still more particularly our invention is concerned with control instrumentalities operating in response to changes in a variable condition to control the latter within close limits, which instrumentalities are robust in construction and adaptable to heavy duty service such as is required in industrial plants, such for example as in steel mills and the like.

In the Thomas R. Harrison Patent 1,946,280, issued February 6, 1934, control instrumentalities were disclosed whereby control elements such as mercury switches were actuated to effect the desired control action in response to the deviations of a variable condition from normal. We have disclosed herein, however, modifications in and improvements over the disclosures of said patent.

Although adaptable to other uses, our invention is of special utility in connection with potentiometric measuring apparatus comprising a galvanometer deflecting in accordance with potentiometric unbalance resulting from a change in value in a condition measured by said apparatus and automatic potentiometer rebalancing means serving also to adjust an indicator or recorder member. When so used our invention includes the control of mercury switches or analogous control devices jointly in response to the deflections of the galvanometer and the deflections of the indicator or recorder member.

These and other attendant objects and advantages will be manifest from the detailed description following when taken in connection with the accompanying drawings whereof:

Fig. 1 is a perspective view of a portion of the apparatus;

Fig. 2 is another perspective view of the control apparatus;

Fig. 2A is a plan view of the recorder carriage;

Fig 5 is another perspective view of a portion of the control apparatus;

Fig. 6 is a diagrammatic view of the operating parts of Fig. 5;

Fig. 7 is a wiring diagram showing the circuit connections for use with the control apparatus;

Fig. 8 is a circuit diagram of another embodiment of our invention, and

Fig. 9 is a circuit diagram of still another embodiment of our invention.

Figure 3:
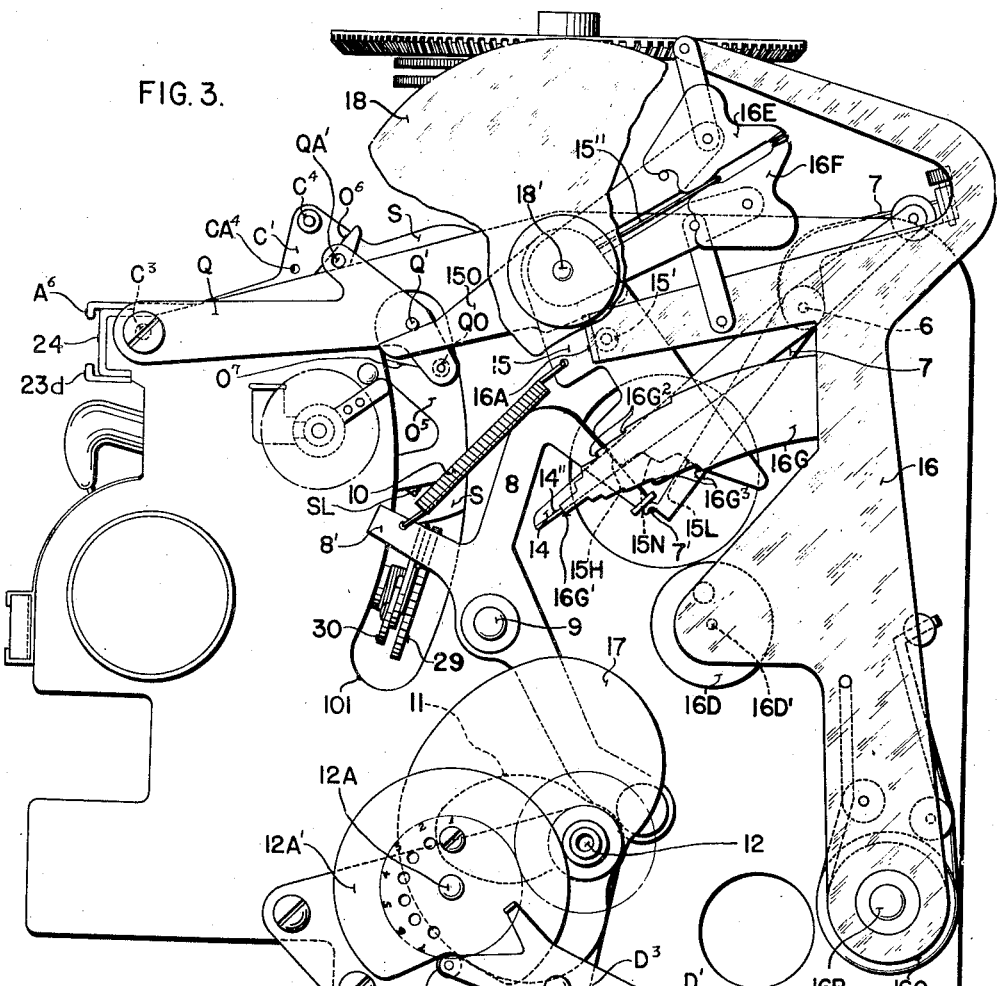
Fig. 3 is a side elevation looking generally from the right of Fig. 1.

The recording potentiometer instrument shown in perspective in Fig. 1, and significant operative parts of which are illustrated in Fig. 1, includes a galvanometer, the pointer 2 of which deflects in response to a condition of unbalance in the potentiometer measuring circuit which may be any well known form including the resistance 21 which may be adjusted to rebalance the potentiometer. The instrument also comprises mechanical relay provisions operated by a constantly rotating driving motor not shown and controlled by the deflection of the galvanometer pointer 2 away from its normal zero position, to periodically rebalance the potentiometer circuit and move a pen or other recorder carriage 23 along a travelling record strip 26 to record the varying value of the quantity measured on said strip.

In respect to its recording potentiometer functions the instrument shown in Figs. 1-6 is of the form disclosed in an application for patent Serial No. 546,290, filed June 23, 1931, jointly by Ernest H. Grauel, Ernest Kessler and Thomas R. Harrison, and in respect to the type of control mechanism employed herein we make use of certain instrumentalities disclosed in the previously mentioned Harrison patent.

The control provisions, which in their construction and arrangement, and in their combination with the above-mentioned rebalancing and carriage adjusting and control mechanism, constitute the features of the present invention, include a control table A and means by which control switches are periodically actuated by said mechanism, when the recorder carriage 23 is displaced in one direction or the other from the control table. The control table A is normally stationary but may be manually adjusted along the path of movement of the carriage 23. The position of the control table along said path corresponds to, and determines the normal value of the quantity measured, while the position at any instant, of the carriage 23 corresponds to, and constitutes a measure of, the current value of said quantity.

The mechanism of the instrument of Fig. 1 through which the deflection of the galvanometer pointer 2 controls the adjustments of the recorder carriage 23 and the rebalancing of the potentiometer circuit on a variation in the quantity or value measured by the galvanometer comprises a pointer engaging and position gauge element 3. The latter is pivotally supported and in connection with the hereinafter mentioned shaft 6 has a loading tendency, which may well be due partly to spring and partly to gravital action, to turn upward into the position in which one or another of the shoulders 5 of the member 3 engage the pointer 2. The element 3 is engaged by, and turns, with the arm 6' of a rock shaft 6. A spring 10 tends to hold a rocker 8 which is journalled on a pivot 9, in the position in which the rocker engages an arm 7 secured to the shaft 6 and thereby holds the latter in a position in which the shoulders 5 are all below the pointer 2.

A cam 11 which is carried by a shaft 12 constantly rotated by the instrument driving motor through a speed reduction gearing, turns the rocker 8 about its pivot against the action of the spring 10, once during each revolution. This allows the arm 7 to turn counter-clockwise, as seen in Fig. 1, until the corresponding angular movement of the shaft 6 is interrupted by the engagement of one or another of the shoulders 5 of the member 3 with the galvanometer pointer 2. The shoulders 5 are so arranged that the turning movement of the shaft 6 and arm 7 thus permitted, will be greater or less according to the deflective position of the pointer 2 at the time. When the arm 7 thus turns counter-clockwise, a lateral projection 7' of that arm engages and turns a secondary pointer element 14 into a position corresponding to the then deflection of the pointer 2. The secondary pointer 14 is loosely journalled on the shaft 6, and has a gravitational loading tendency to turn in the clockwise direction as seen in Fig. 1, so that the arm 14 normally bears against the projection 7' of the arm 7.

At the end of each angular adjustment of the secondary pointer 14 into a position corresponding to the then deflection of the galvanometer 2, one or another of the three shoulders 15H, 15N and 15L of a locking member 15, engages the bottom wall of a slot 14' in the member 14 and thereby frictionally holds the latter in the position occupied by it when such engagement occurs. When the pointers 2 and 14 occupy their neutral positions, the shoulder 15N of the member 15 comes into locking engagement with the member 14. When the galvanometer pointer 2 has deflected to the right as seen in Fig. 1, as it does when the actual value of the quantity measured is lower than that indicated by the previously made and still existing potentiometer adjustment, the secondary pointer 14 is engaged and locked by the shoulder 15L. When the galvanometer pointer deflects in the opposite direction from its neutral position, as it does when the actual value of the quantity measured is higher than that indicated by the existing potentiometer adjustment, the pointer 14 is engaged and locked by the shoulder 15H of the member 15. The locking part 15 is given a tendency to move into locking engagement with the secondary pointer 14 by the spring 10, but is periodically held out of such engagement by the action on its projection 15' of a projection 16A carried by a ratchet lever 16 pivoted at 16B.

A spring 16C gives the lever 16 a tendency to turn forward in the clockwise direction as seen in Fig. 1, but throughout the major portion of each rotation of the shaft 12 the lever 16 is held in a retracted position by a cam 17 carried by said shaft and engaged by the cam follower roll 16D carried by the lever 16. The ratchet lever 16 is operatively connected to two pawls 16E and 16F cooperating with a toothed wheel 18. Each of said pawls have a gravital tendency to occupy a position in which it does not engage the teeth of the wheel 18, but one or the other of the pawls is brought into engagement with the teeth of the wheel on each forward or clockwise movement of the lever 16, if the locking part 15 is then at one side or the other of the intermediate or neutral position which it occupies when the galvanometer pointer 2 is in its neutral position.

The position assumed by the part 15 when in locking engagement with the secondary pointer 14, controls the action of the pawls 16E and 16F by virtue of the fact that a collar or hub portion 15''' of the part 15 carries a spring pawl engaging arm 15''. The movement of the locking part 15 into the position in which its shoulder 15H engages the secondary pointer 14 causes the arm 15'' to move the pawl 16E into operation engagement with the teeth of the ratchet wheel 18, and the clockwise or forward movement of the ratchet lever 16 then gives a clockwise adjustment to the ratchet wheel. Conversely, when the part 15 moves into the position in which its shoulder 15L engages the secondary pointer 14, the arm 15'' shifts the pawl 16F into operative engagement with the wheel 18, and the latter is then adjusted in the counter-clockwise direction.

The extent of the adjustment then given the wheel 18 is made dependent upon the position of the secondary pointer 14, as said position determines which of the various shoulders of an arm 16G carried by the lever 16 shall then engage a projecting portion 14'' of the secondary pointer 14 and thereby arrest the forward movement of the ratchet lever 16. In the neutral position of the galvanometer pointer and secondary pointer 14, the projection 14'' of the latter engages the central shoulder 16G' of the arm 16G and the lever 16 is then held against any operative movement in the clockwise direction. When the secondary pointer position is more or less to one side or the other of its neutral position, the portion 14'' engages an upper or lower shoulder $16G^2$ or $16G^3$ more or less ditsant from the central shoulder $16G^1$ and the lever 16 is then permitted more or less forward movement.

The rotation of the wheel 18 in one direction or the other effects corresponding potentiometer rebalancing adjustments and position adjustments of the recorder carrier 23. The rebalancing adjustments are effected by means of a rheostat shaft 19 which is geared to the shaft 18' on which the wheel 18 is secured. The rotation of the shaft 19 moves a bridging contact 20 along the convolutions 21 of a potentiometer resistance helically disposed about the axis of the shaft 19, and thereby varies the amount of said resistance in the potentiometer circuit. The resistance adjustments made in response to a deflection of the galvanometer pointer in one direction away from its neutral position rebalances, or tends to rebalance, the potentiometer circuit and thereby returns, or tends to return, the galvanometer pointer to its neutral position.

The rotation of the wheel 18 adjusts the recorder carrier 23 by virtue of the fact that the teeth of the wheel 18 are in mesh with the teeth of a gear carried by a carriage adjusting shaft 22 which is formed with a thread groove 22' of coarse pitch which receives a cam or mutilated screw thread rib secured to the carriage 23, so that the latter is moved longitudinally of the shaft 22 as the latter is rotated.

The marker carriage 23 comprises a frame portion formed of a single piece of sheet metal cut and bent to form a flat underbody portion with uprising projections. Those projections include two apertured ears 23a at the rear corners of said body portion transverse to and through which the shaft 22 extends; two projections 23b, one at each front corner of said body portion which bear against the inner edge and upper side of the lower flange of a channel bar or rail 24 forming part of the instrument framework, and three intermediate projections 23c which extend in vertical planes transverse to, and are arranged in a row parallel to, the shaft 22 and rail 24. In addition the body portion of the carriage frame is provided with a forwardly extending tongue passing beneath the rail 24 and terminating in an uprising pointer or index 23d adapted to cooperate with a scale marked on the front face of the rail 24 to indicate the position of the pen carriage, and the value of the quantity measured and recorded by the instrument. Projections 23c support a shaft 23e carrying a part 23F, on which is mounted the recording pen 25 which traces a record of the quantity measured on a record sheet 26. The instrument includes means shown in the drawings for adjusting the part 23F relative to the carriage 23 in the longitudinal direction of the shaft 23e to compensate for the expansion and contraction of the record sheet 26 caused by changes in the atmospheric humidity. Such compensating provisions do not vary the position of the recorder carriage 23 though they vary the position of the pen supported by the carriage, and form no part of the present invention, and therefore need not be described or further referred to herein.

The record sheet 26 passes over and is given feeding or advancing movements by a record feed roll 27. The latter is intermittently rotated by means of a worm and screw connection between the shaft of the roll 27 and a transverse shaft 28. Shaft 28 is intermittently actuated by means of a ratchet and lever device 30 which is engaged and oscillated by the arm 8' of the rocker 8 on each oscillation of the latter.

The control table A of the instrument shown in Figs. 1 and 2 comprises a sheet metal frame having ear portions A' apertured for the passage of a shaft B mounted in the instrument framework alongside the shaft 22 and having bearing parts A² which engage and slide along the upper flange of the rail 24. To facilitate the adjustment of the control table A along the path of travel of the pen carriage 23, the shaft B is shown as formed with a thread groove B¹ receiving a cam or mutilated thread rib part A³ secured to the control table frame. The shaft B may be rotated to adjust the control table in any suitable manner as by means of a transverse shaft geared to the shaft B and rotated by an operating handle or knob at the front of the instrument. An index A⁶ in conjunction with a scale on the front face of the rail 24 may indicate the adjustment of the table and the corresponding normal value of the quantity measured.

A member $a$ is hinged at one edge to the frame of the control table A by a pivot or pintel shaft $a'$ extending parallel to the shaft B. The member $a$ is formed with guiding provisions including a part $a^2$, for a bar-like part C which extends parallel to the shaft B and is rigidly secured at its ends to arm C¹ at opposite ends of the instrument which are pivotally connected at C³ to the instrument framework so that the yoke like structure formed by the bar C and arms C¹ may turn with respect to the instrument framework about an axis coinciding with that of the hinge connection $a^1$, between the table A and part $a$. The part $a$ and bar C are held by the said guiding provisions against independent turning movements about the axis of their respective pivotal supports. The part $a$ and bar C have a gravital tendency to move from their highest positions, above that shown in Fig. 4 into or toward their lowermost positions. Their movement downward below their last-mentioned positions is prevented by the engagement of a projection C⁴ from the arm C¹ with an adjacent portion of the instrument framework. The parts $a$ and C are positively held in their uppermost positions by the action of a link O⁵. As will hereinafter appear, link O⁵ is given rising movements during which the edge O⁶ of link O⁵ will engage and raise the projection C⁴ of arm C¹ carrying the latter to its highest or clearance position. The extent to which the parts $a$ and C are permitted to swing downwardly from their uppermost positions during each period when the action of the cam 11 renders the link O⁵ temporarily inoperative, depends upon the then relative positions of the table A and the recorder carriage 23. When the value of the quantity measured is so low that the carriage 23 is entirely at the low side (left-hand side as seen in Fig. 1) of the control table A, the carriage 23 does not interfere with the movement of the parts $a$ and C into their lowermost positions.

Figure 4:
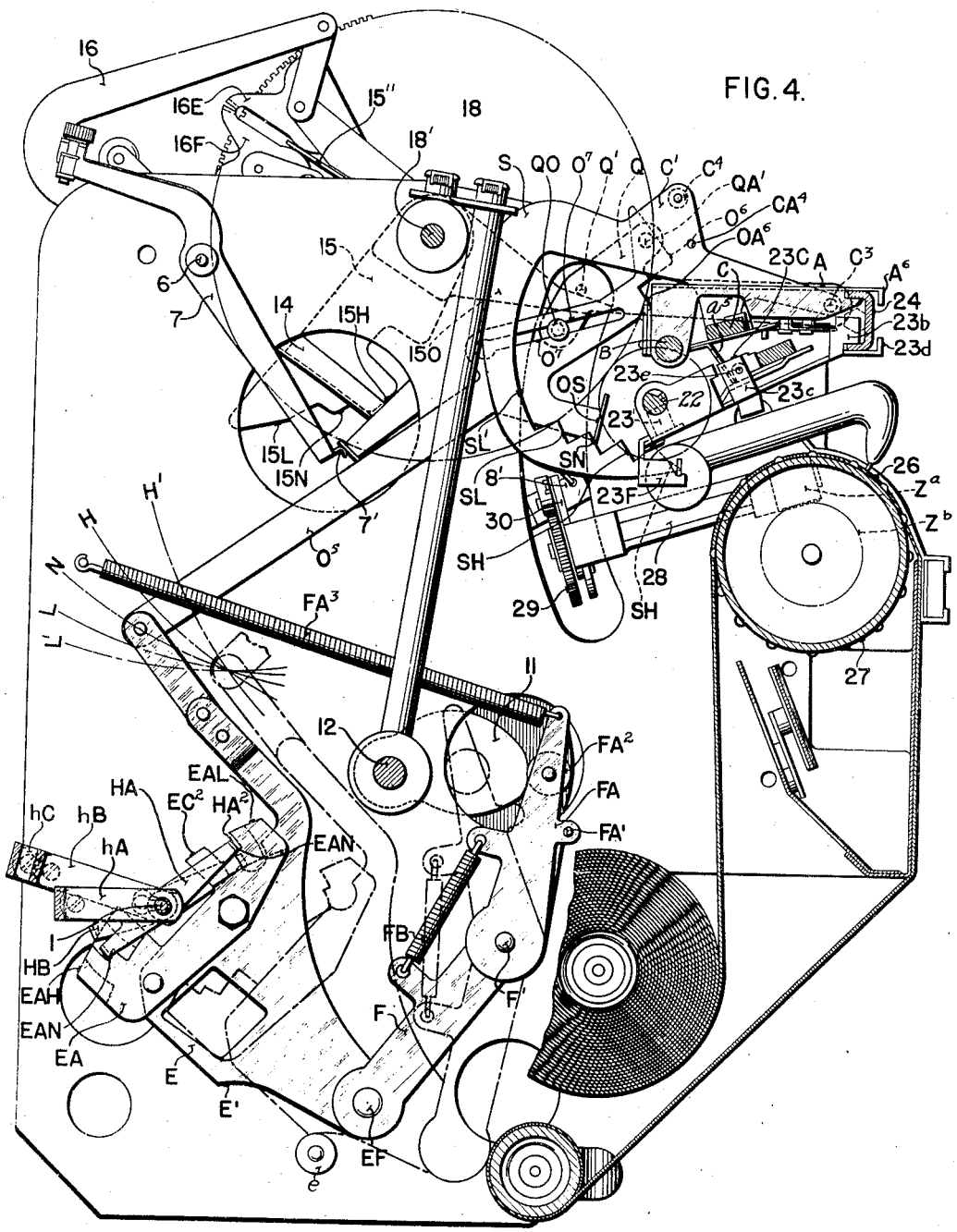
Fig. 4 is a sectional side elevation of the opposite side of the instrument side plate shown in Fig. 3.

When the current value of the quantity measured is suitably close to the normal value of that quantity, the control table and marker carriage 23 are in such relative positions that downward movement of the hinged part $a$ is prevented or restricted by the engagement of a portion of that part with the marker carriage 23. For the purpose of such engagement the part $a$, as shown in Figs. 2 and 4, has a carriage engaging portion $a^5$ detachably secured to it. The part $a^5$ is in the form of a plate with a downwardly projecting body portion terminating in a lower horizontal edge $aH^1$, and a series of steps $aH$, $aN$, $aL$ and $aL^1$ vertically removed from edge $aH^1$ but parallel thereto and having at its upper edge a lateral flange portion bearing against the underside of the part $a$ at the rear edge of the latter and detachably secured thereto by clamping screws $a^7$. The bodies of said screws pass through slots in the part $a$ which are open at the rear edge of the latter.

The lower edge $aH^1$ of the projection $a^5$ is so disposed that it may engage and rest upon the shoulder 23C formed by the upper edge of the projection 23c at the high side of the recorder carriage 23 (the right-hand side as seen in Fig. 1), when the position of said carriage is such as to hold the shoulder 23C beneath said edge $aH^1$. In the condition just described the control table part $a$ cannot move downward below the position in which edge $aH^1$ contacts shoulder 23C which is the upper operating position of the part $a$.

The movements of the part $a$ above this position are inoperative movements insofar as the actuation of the control devices is concerned. The uppermost position of the part $a$ above this position may be called a clearance position since in that position, part $a$ cannot interfere in any way with movements of the carriage 23, all of which are given the latter while the part $a$ is held in said clearance position.

When an increase in the value of the quantity measured results in a movement of the recorder carriage 23 to the high side of the control table A, that movement causes the part $a$ to be positively secured against down movement from its uppermost operative position by adjusting a latch member D, into its latching position. The latch D is pivotally mounted on a stud $A^4$ depending from the underside of the plate-like body of the table A. In the latching position of the member D, a finger-like portion of the member extends beneath a portion $a^8$ of the part $a$ which is some distance to the rear of the hinge shaft $a'$.

Latch member D is automatically moved into and out of its latching position, as the carriage 23 moves to and returns from the high side of the control table A, by means which include a vertically disposed shoulder or edge 23B of the projection 23b at the low side front corner of the recorder carriage frame, a member $d$ pivotally mounted on a stud $A^5$ depending from the underside of the control table frame alongside the stud $A^4$, and a spring $Dd$ connecting the members D and $d$. The spring $Dd$ tends to move the member D in the counter-clockwise direction as seen in Fig. 2 and to move the member $d$ in the opposite direction about their respective pivotal supports $A^4$ and $A^5$; such turning movements of the members D and $d$ are prevented by the engagement of the finger portion $d'$ of the part $d$ with the shoulder $D'$ of the member D, when the latter is in its latching position as shown in Fig. 2. In the non-latching position of the member D, the finger $d'$ engages a shoulder $D^2$ of the part D.

The members D and $d$ are moved from the latched position shown in Fig. 2 into the unlatched position and back again into the position shown in Fig. 2 by the engagement of the recorder carriage shoulder 23B with the cam shaped front edges $D^5$ and $d^5$ of the members D and $d$, respectively. The edges $D^5$ and $d^5$ are so respectively shaped and disposed that as the carriage moves to the high side of the control table, the shoulder 23B acts on the edge of $d^5$ to turn the member $d$ counterclockwise, as seen in Fig. 2 so that the spring $Dd$ may then move the member D into its latching position in which its shoulders $D'$ engages the finger $d'$. When the carriage 23 subsequently moves back from its high position, the shoulder 23B engages edge $D^5$ of the member D and moves the latter into its non-latching position while permitting the spring $Dd$ to move the member $d$ into the position in which its finger $d'$ engages the shoulder $D^2$ of the member D, and holds the latter in its non-latching position.

When the value of the measured condition is at normal, which will occur when the index $23d$ of the carriage 23 is adjacent the index $A^6$ of the table A, the projection 23C of the carriage 23 will be so disposed with relation to the table A that upon a downward movement of the part $a$, the step $aN$ of the part $a^5$ will engage said projection. A slight increase in the value of the quantity measured will result in a deflection of the carriage 23 to the right as seen in Fig. 2 in which position a downward movement of the part $a$ will result in engagement of the step $aH$ with projection 23C, a further deflection of carriage 23 to the right or the high side will cause engagement of the step $aH^1$ with projection 23C when part $a$ is depressed as previously described. On a slight decrease in the value of the quantity measured, from the position in which the projection 23C is disposed beneath the step $aN$, the projection 23C will be in a position in which it is adapted to be contacted by the step $aL$ upon a downward movement of the part $a$, and upon a further decrease in the quantity measured resulting in further deflection of the carriage 23 to the left as seen in Fig. 2 the projection 23C will be in a position in which it is adapted to be engaged by the step $aL^1$. Further deflection of the carriage 23 to the low or left hand side will carry the projection 23C beyond the province of the part $a$ and in this position the part $a$ will not be intercepted by the projection 23C but the part $a$ will be permitted its full downward motion as limited by engagement of the projection $C^4$ of the member $C^1$ with the top edge of the instrument side plate. The lowest limit to which table part $a$ is permitted to fall when projection $C^4$ engages the side plate is also the limit to which part $a$ falls when step $aL^1$ engages projection 23C.

The above described cooperation of the control table A and the pen carriage 23 may be utilized to directly effect control action as desired but it is the object of the present invention to combine with the action resulting from the cooperation of the control table and the pen carriage, further control functions contributing to a finer degree of control than would be possible with the former alone. The action due to the cooperation of table A and carriage 23 just described might be termed a magnitude function since it is an action in response to the total deviation of the quantity from a predetermined value and I desire to combine therewith a control action which is a function of the rate of change of said quantity to produce a resultant control action. As previously described, the mechanical relay provision of Fig. 1 rebalances the potentiometric circuit, to the unbalance of which the galvanometer pointer 2 is responsive, and accordingly the rebalancing operations restore or tend to restore the galvanometer pointer 2 to its neutral position or null point. The rebalancing operations occur at regular intervals so that the periodic restoration to and deflection from neutral of the galvanometer pointer 2 renders the extent of deflection of the latter when clamped at regular intervals, a measure of the rate of change of said quantity.

The means by which the existing deflection of the galvanometer pointer 2 comprising the rate of change component, is measured and combined with the deviation component resulting from the cooperation of the control table A and the carriage 23 includes stop and guiding members for a link $O^5$ shown in Fig. 4 and a floating member E connected to said link. The member E is pivotally connected at EF to the part F of a compound lever comprising parts F and FA each pivoted to the instrument framework at $F^1$ and normally held against relative movements by a spring FB. The latter tends to hold the part F in engagement with a projection $FA^1$ of the part FA, but serves as a safety device which may yield to prevent injury of the part in case the switch parts actuated by the member should jam. A spring $FA^3$ extends between the upper end of lever FA and the instrument framework and tends to hold the part F, FA and E in the position shown in dotted lines in Fig. 4. The lever part FA is moved from the dotted line position into the full line position in Fig. 4 once during each rotation of the shaft 12 carrying the cam 11 which effects such movement by its engagement with a cam roller FA² carried by the lever part FA.

When the parts are in the position shown in dotted lines in Fig. 4, the lower cam edge E¹ of the member E rests upon a roller support e mounted on the instrument framework, and the position of the member E is then such that the link O⁵ is raised to an initial or clearance position from which it is subsequently permitted to descend. When the lever part F is turned in the clockwise direction from its Fig. 4 dotted position the weight of link O⁵ and member E causes the latter to rotate about pivot EF, moving link O⁵ downward until intercepted by engagement of its upper end with the cooperating control mechanism.

The control mechanism comprising the leveling and guiding means for the link O⁵ includes an extension 150 of the member 15, a lever Q and extension S of arm C¹. The lever Q, which is the element by which the rate of change component is introduced into the collective control action, is journalled to the instrument framework at C³ and carries a pin QO adapted to be engaged by slot O⁷ of link O⁵ whereby the up and down movements of the latter are guided over one or another path depending upon the position of pin QO. Pin QO extends through the aperture 101 in the instrument side plate. Lever Q has a gravitational tendency to fall downward into a position in which the pin Q¹ thereof engages the upper edge of extension 150 of member 15. As explained in connection with Fig. 1 the member 15 once in each cycle of operation of the instrument, assumes a position depending upon the then position of the galvanometer with respect to its normal position. The member 15 will be in a neutral position wherein step 15N engages the secondary pointer 14, when permitted to do so, if the galvanometer is then at its neutral position indicating a stationary condition of the measured quantity. A trend of the measured quantity above or below its then value will result in an engagement of step 15H or 15L of the member 15 with the pointer 14 thereby positioning the extension 150 of the member 15 to one or the other side of said neutral position. Each of the positions in which the lever Q is held by extension 150 defines a position for the pin QO of the member Q thereby forming three generally vertical paths for the link O⁵.

The downward movement of the link O⁵ over one or another of its three paths as determined by the pin QO will be terminated by engagement of the projection OS of the link O⁵ with one of a series of steps SL¹, SL, SN, SH, or SH¹, of the extension S of the arm C¹. The extension S will be angularly positioned about the center C³ upon each downward movement of the part a, into one of five positions depending upon which of the steps aL¹, aL, aN, aH, or aH¹, of the part a is intercepted by the projection 23C of the carriage 23. The particular one of the steps of the extension S which is engaged by the projection OS of the link O⁵ will therefore be determined jointly by the path over which the link O⁵ travels in the downward movement of the latter as determined by the then position of the pin QO and upon the angular position of the extension S about the pivot C³. When the step 15N of the member 15 engages the secondary pointer 14, as it will when the trend of the condition is stationary, and the step aN of the part a is then in engagement with the part 23C of the carriage 23, the step SN of the extension S will be engaged by the projection OS of the link O⁵ in the downward movement of the latter.

As previously described, the downward movement of the link O⁵ is caused by the weight of the parts as the member E moves to the left in Fig. 4 and the cam edge E¹ is formed with a sharp initial drop so that link O⁵ rapidly moves into contact with extension S upon the beginning of the movement to the left of member E. Further counterclockwise movement of the member E as seen in Fig. 4 with the projection OS of the link O⁵ in engagement with the step SN of the extension S will result in deflection of the member E over the middle path indicated diagrammatically as N in Fig. 4, of a plurality of paths of which in the present embodiment there are five. So long as the trend of the condition is stationary the pin QO will be in the position just described at the commencement of each downward movement of the link O⁵ and the particular step of extension S which is then engaged by the projection OS will then be determined solely by the position of the pen carriage 23 with respect to the control table A and thereby in accordance with the value of the measured condition with respect to the normal value of the latter. If the downward movement of the part a results in engagement of its step aL with the projection 23C the step SL of extension S will be positioned in the path of the projection OS in the down travel of the link O⁵. If in the downward travel of the part a, the step aL¹ of the latter is engaged by the projection 23C the step SL¹ of the extension S will be then positioned in the path of the projection OS. Upon a rise in the magnitude of the measured condition whereby the down movement of the part a results in engagement of the step aH with the projection 23C the step SH of the extension S will be positioned in the path of the projection OS and upon a further deflection of the carriage 23 to the high side whereby the step aH¹ of the part a contacts the projection 23C, or part a is latched up, the step SH¹ of the extension S will be positioned in the path of the projection OS of the link O⁵. As will be clear from Fig. 4, movement of member E to the left with link O⁵ in engagement with steps SH, SH¹, SL or SL¹, of member S, will result in member E deflecting over paths H, H¹, L and L¹ respectively of Fig. 4.

If the trend of the condition is rising or falling the step 15H or the step 15L of the member 15 will engage the secondary pointer 14 upon the counterclockwise movement of the member 15 as seen in Fig. 4 and the resultant change in the position of the pin QO will determine a path for the link O⁵ which, for a given position of extension S, will result in engagement of its projection OS with a different step of the extension S than would be engaged when the member 15 is in its neutral position.

With the step 15H of the member 15 in engagement with the secondary pointer 14 the pin QO will be turned to a position clockwise of the neutral position illustrated in Fig. 4 thereby moving the projection OS transversely of the path of the link O⁵ so that projection OS is moved into alignment with a step of the extension S which is one step further removed to the high side than is the case when the pin QO is in its neutral position. Thus with the part $a$ of the table A in such position that its step $aN$ engages the projection 23C, and the member 15 in such position that its step 15H is in engagement with the secondary pointer 14 the down movement of the link $O^5$ will result in engagement of the projection OS with the step 15H of extension S. With the step 15H in engagement with the secondary pointer 14 but the step $aH$ of the part $a$ in engagement with the projection 23C the down movement of the link $O^5$ will result in engagement of the projection OS with the step $SH^1$ of the extension S. With the step 15H in engagement with the secondary pointer 14 and the step $aH^1$ of the part $a$ in engagement with the projection 23C the subsequent downward movement of the link $O^5$ will again result in engagement of the projection OS with the step $SH^1$ of extension S. In the last mentioned condition of the parts it will be understood that we might extend the operation by providing an additional step on extension S and might modify the part $a$ and extension S to extend the operation indefinitely, but we prefer to make the actuation resulting from the engagement of projection OS with the step $SH^1$ the maximum actuation in that direction.

Similarly when step 15L of the member 15 is in engagement with the secondary pointer 14, pin QO will be moved to a position counterclockwise of the neutral position of Fig. 4 and with step $aN$ of part $a$ in engagement with the projection 23C, the step SL of extension S will be in the path of the projection OS of link $O^5$. With step 15L in engagement with the secondary pointer 14 the engagement of step $aL$ of the part $a$ with projection 23C will result in engagement of the projection OS of link $O^5$ with the step $SL^1$ of the extension S upon downward movement of the link $O^5$. With step 15L in engagement with pointer 14 and step $aL^1$ in engagement with projection 23C, the projection OS will again engage step $SL^1$ of extension S, the latter being the lowest step provided in this embodiment.

Each of the positions of the link $O^5$ in engagement with a step $aL^1$, $aL$, $aN$, $aH$ or $aH^1$ of the extension S, above referred to, will determine a different path for the member E in its movement to the left in Fig. 4 which will correspond respectively to the paths $L^1$, L, N, H and $H^1$ diagrammatically shown in Fig. 4.

The paths indicated in Fig. 4 which are selectively taken by the member E in accordance with the foregoing may be conveniently tabulated as follows in which $aH^1$, $aH$, $aN$, $aL$, and $aL^1$ indicates the step of part $a$ then in contact with projection 23C, 15H, 15N and 15L indicates the step of member 15 then in contact with pointer 14.

Table No. 1

| Trend (part 15) | Value (part a) | | | | |
|---|---|---|---|---|---|
| | High+ $aH^1$ | High $aH$ | Normal $aN$ | Low $aL$ | Low− $aL^1$ |
| Rising (15H) | $H^1$ | $H^1$ | H | N | L |
| Stationary (15N) | $H^1$ | H | N | L | $L^1$ |
| Falling (15L) | H | N | L | $L^1$ | $L^1$ |

The movement of the member E to the left in Fig. 4 will thus be terminated with the latter in one of the five positions and the member E may be utilized to actuate any of various known control devices in deflecting over the selected one of its five control paths. We preferably actuate three switches indicated at $A^0$, $B^0$ and $C^0$.

The means for actuating the switches $A^0$, $B^0$ and $C^0$ through member E may, as shown in Figs. 4 and 5 and 6, include three switch actuating members EA, EB and EC, all effectively integral with the member E, and adapted to cooperate with three arms HA, HB and HC, the latter of which are journalled upon the shaft I. Arms HA, HB and HC are attached to yoke members $hA$, $hB$ and $hC$ respectively, to the latter of which are secured the downwardly extending switch holding brackets $hA^1$, $hB^1$ and $hC^1$ carrying switches $A^0$, $B^0$ and $C^0$ respectively. Switches $A^0$, $B^0$ and $C^0$, as shown, are mercury switches of the well known type comprising an envelope with a quantity of mercury therein adapted to shift within the envelope, and bridge metal contacts disposed within the latter. Switch $A^0$ is adapted when tilted in one direction, to bridge two contacts disposed in one end of the envelope, when tilted in the opposite direction, to bridge two contacts disposed in the opposite end of the envelope and when in a position intermediate the two positions just mentioned is adapted to bridge one of each of the two end pairs of contacts and a fifth contact disposed in the center of the envelope. Switches $B^0$ and $C^0$ are adapted to independently occupy only two positions corresponding to the two tilted positions of switch $A^0$ and have two pairs of end contacts as in switch $A^0$ but no fifth or center contacts since switches $B^0$ and $C^0$ never occupy an intermediate position.

Arms HA, HB and HC, adapted to oscillate about shaft I are provided with projections $HA^1$—$HA^2$, $HB^1$—$HB^2$, and $HC^1$—$HC^2$, respectively which are formed in the plane of movement of members EA, EB and EC. Members EA, EB and EC are provided with fingers adapted to selectively engage the projections of arms HA, HB and HC as member E is deflected over one or another of its five paths. Member EC is provided with a finger $EC^1$ adapted when member E travels over path $H^1$, H, N or L, to engage projection $HC^1$ of arm HC and turn the latter counter-clockwise as seen in Figs. 5 and 6 to thereby tilt switch $C^0$ to what may be termed a forward position. Member EC is provided with another finger $EC^2$ which is adapted, when the member E travels over path $L^1$ to engage projection $HC^2$ of arm HC turning the latter clockwise to thereby tilt switch $C^0$ into a back position. Member EB is provided with a finger $EB^1$ adapted to engage projection $HB^1$ of arm HB and turn the latter counter-clockwise when member E deflects over path H, N, L or $L^1$ thereby tilting switch $B^0$ to its forward position. Member EB is provided with another finger $EB^2$ adapted to engage projection $HB^2$ of arm HB when member E is deflected over path $H^1$, to turn arm HB clockwise thereby tilting switch $B^0$ to its back position. Member EA is provided with two fingers $EA^1$ and $EA^2$ each of which is provided with a high portion EAH or EAL and a low portion EAN. When member E is deflected over path H or $H^1$ the edge EAH is adapted to engage projection $HA^1$ of arm HA turning the latter counterclockwise in Fig. 5 to tilt switch $A^0$ to its forward position. When member E is deflected over path L or $L^1$ the edge EAL is adapted to engage projection $HA^2$ of arm HA to turn the latter clockwise thereby tilting switch $A^0$ to its back position. When member E deflects over its intermediate path the edge EAN of each finger $EA^1$ and $EA^2$ engages a projection $HA^1$ and $HA^2$ whereby arm EA is moved to a position intermediate its two extreme positions and switch $A^0$ is lodged in its mid or neutral position. A table of the foregoing actions may be conveniently made as follows in which F, $B^0$ and N denote the forward, backward and neutral positions of switches $A^0$, $B^0$ and $C^0$.

*Table No. 2*

| Switch | Path of member E | | | | |
|---|---|---|---|---|---|
| | $H^1$ | H | N | L | $L^1$ |
| $A^0$ | F | F | N | B | B |
| $B^0$ | B | F | F | F | F |
| $C^0$ | F | F | F | F | B |

Switches $A^0$, $B^0$ and $C^0$ as shown in Fig. 7, are adapted to control an electrical motor M which may be arranged to control a corrective agent for the condition to which the galvanometer 2 is responsive. If the galvanometer 2 is responsive to temperature, for example, the fuel supply to a furnace burner or the like, for governing said temperature may be supplied through the pipe $N^3$ having inserted therein the control valve $N^1$. Control valve $N^1$ may be adjusted by means of the lever $N^2$ under control of the lever MN, the latter of which is positioned by the motor M. Motor M is of the reversible type having fields $Mh$ and $Ml$ adapted, when individually energized, to turn a worm $M^1$ in a direction to close or open, respectively, the valve N. As diagrammatically shown, worm $M^1$ is connected by means of worm wheel $M^2$ and link $M^3$ to the lever MN.

Another link $M^4$ attached to worm wheel $M^2$ is adapted to actuate limit switch mechanism MS comprising a block $MS^1$, pivoted at $MS^2$ and cooperating switch blades operated by the block. Rotation of wheel $M^2$ and consequent movement of link $M^4$ will result in proportional rotation of block $MS^1$ so that the position of the latter is proportional at all times to the valve position. The upper right and lower left cam edges of block $MS^1$ are adapted to engage respectively the switch blades $MSh$ and $MSh^1$ pivoted at $MS^3$ and $MS^4$, to separate the switch blades in succession from the stationary contacts $Mh^1$ and $Mh^2$, the latter of which are connected by conductor $Mh^3$ to field $Mh$ of motor M. Upon energization of field $Mh$ through contact $MS^4$, block $MS^1$ will be rotated in the clockwise direction until switch blade $MSh$ is parted from contact $MS^1$ by the contact of block $MS^1$. The rotation of block $MS^1$ sufficient to open switch $MSh$ is insufficient to open switch $MSh^1$, but upon energization of field $Mh$ through contact $Mh^2$ the block $MS^1$ will be rotated further in the clockwise direction until switch blade $MSh^1$ is contacted and opened by the lower left cam edge of block $MS^1$. Similarly, the field $Ml$ is connected to stationary contacts $Ml^1$ and $Ml^2$, through conductor $Ml^3$, which contacts cooperate with switch blades $MSl$ and $MSl^1$ pivoted at $MS^5$ and $MS^6$, the switch blades being adapted to be successively contacted by the upper left and lower right cam edges respectively of the block $MS^1$ as the latter is rotated counterclockwise by energization of field $Ml$.

The rotation of block $MS^1$ also actuates two other switch members MSA and $MSA^1$. Switch member MSA is pivoted at $MS^7$ and is connected by a pin and slot to block $MS^1$ whereby rotation of the latter turns member MSA in the opposite direction. Member MSA forms in effect a two sided contact adapted to engage contact $Ml^1$ or $Mh^1$ accordingly as block $MS^1$ is rotated clockwise or counterclockwise an amount sufficient to open respectively, contact $MSh$ or $MSl$. Switch member $MSA^1$ is pivoted at $MS^8$ and is also connected to block $MS^1$ by a pin and slot so that it is rotated in the opposite direction upon rotation of block $MS^1$. Contact $Mh^4$ and $Ml^4$ carried by member $MSA^1$ are adapted to engage contacts $Mh^2$ and $Ml^2$ when block $MS^1$ is rotated sufficiently to open respectively, the switches $MSl^1$ and $MSh^1$.

When the value of the condition is appreciably low and the trend is falling or is stationary, switches $A^0$, $B^0$ and $C^0$ will occupy the positions shown in Fig. 7 in which switches $A^0$ and $C^0$ are in the backward positions and switch $B^0$ is in its forward position. This relation of the parts will exist in a temperature control system, for example, when the furnace or the like is being started up while cold. A circuit will be thus completed from line LC to switch $C^0$, through the latter to conductor $Cl$ and switch blade $MSl^1$, contact $Ml^2$, conductor $Ml^3$ to field $Ml$, armature $Mu^1$, to the opposite line conductor $LC^1$. Motor M will thereby be rotated in a direction to open valve $N^1$ which movement will be terminated by the engagement of cam $MS^1$ with switch blade $MSl^1$, the prior engagement of switch blade $MSl$ having no effect during this operation. Motor M is thus rotated to the limit of its movement in the opening direction. At the end of the movement of block $MS^1$, the members MSA and $Mh^4$ will be brought into engagement with contacts $Mh^1$ and $Mh^2$ respectively.

On a rise in the trend of the condition resulting from the relatively large correction by valve $N^1$, the member E will be deflected over its path L as a result of the engagement of step 15H of member 15 with pointer 14, the part a still being appreciably below normal. Switch $C^0$ will thus be actuated to its forward position and switches $A^0$ and $B^0$ would be actuated to their backward and forward positions respectively if they were not already in those positions. A circuit will be thereby completed from line LC to switch $C^0$, conductor CB, switch $B^0$, conductor BD, switch $D^0$, conductor DA, switch $A^0$, conductor AL and switch blade $MSh^4$ which is then in engagement with contact $Mh^2$, through the latter and conductor $Mh^3$ to field $Mh$ of motor M. As hereinafter explained, the above mentioned switch $D^0$ is closed except during a brief portion of each operating cycle, in which, for safety reasons, it is moved into open position shown in Fig. 7. Motor M will thus be rotated to move valve $N^1$ in the closing direction which will be terminated by the separation of switch blade $Mh^4$ and contact $Mh^2$. Although the movement of valve $N^1$ just described will reduce the fuel supply, the adjustment of the parts is such that the fuel supply will still be greater than the amount required to maintain the condition at normal.

If the condition trend is then checked and is stationary but with the value of the condition somewhat below normal, the member E will be again deflected over its path L and would again complete the circuit just traced if the contact $Mh^2$ and switch blade $Mh^4$ were not then separated, thus maintaining a valve opening somewhat greater than normal.

When the condition rises as a result of the still larger than normal valve opening but with the condition slightly below its normal value, the member E will be deflected over its neutral path N whereby switch $A^0$ will be adjusted to is mid position and each of switches $B^0$ and $C^0$ would be adjusted to its forward position if it were not already in that position. A circuit will thus be closed over the conductor LC to the switch $C^0$, conductor CB, switch $B^0$, conductor BD, switch $D^0$, conductor DA, switch $A^0$, conductor AN to switch blade MSA which is then in engagement with the contact $Mh^1$, through the latter, through conductor $Mh^3$ to field $Mh$ of the motor M, armature $Ma^1$ to the line $LC^1$. Motor M will be energized to move the valve $N^1$ in the closing direction, which movement will be terminated by the disengagement of switch blade MSA and the contact $Mh^1$. The position in which the valve $N^1$ is disposed at the termination of the foregoing operation is calculated to be sufficient to maintain the condition at its normal value.

When the value of the condition has increased to its normal value and at that time the trend is stationary, the member E will again be deflected over its neutral path N which would result in the completion of the same circuit as just described, if the limit switch were not then open so that the valve $N^1$ will be maintained in its normal position.

Upon a rising trend of the condition, with the value at normal, the member E will be deflected over its path H whereby switch $A^0$ will be urged to its forward position and each of switches $B^0$ and $C^0$ would be actuated to its forward position if they were not already in that position. A circuit will thus be completed over conductor LC, switch $C^0$, conductor CB, switch $B^0$, conductor BD, switch $D^0$, conductor DA, switch $A^0$, conductor $Ah$, switch blade $MSh$, contact $Mh^1$, conductor $Mh^3$ to field $Mh$ of motor M thereby energizing the latter to move valve $N^1$ in the closing direction. The closing movement of valve $N^1$ will continue until terminated by the disengagement of member $MSh$ and contact $Mh^1$. The member MSA during this movement will be brought into engagement with contact $Ml^1$.

If the last mentioned movement of valve $N^1$ is sufficient to check the trend of the condition and the trend therefore becomes stationary, the part $c$, representative of the value of the condition, will be in a position slightly to the high side and member E will again be deflected over its path H by reason of the slightly high value of the condition and the stationary trend. Motor M will not therefore be further energized as a result of this action but will maintain the valve $N^1$ in the position in which it supplies somewhat more than the normal fuel supply.

If the trend of the condition continues to rise, the combination of the high and rising condition will result in deflection of member E over its path $H^1$ thereby turning switch $B^0$ to its backward position but maintaining the forward position of switch $A^0$ and switch $C^0$. A circuit will be thus completed from conductor LC to switch $C^0$, conductor CB to swich $B^0$, over conductor $Hh$ to member $MSh^1$, which is then closed because the preceding motion of valve $N^1$, sufficient to open member $MSh$, is insufficient to open member $MSh^1$; to contact $Mh^2$, conductor $Mh^3$, field $Mh$, armature $Ma^1$ and the opposite side of the line $LC^1$. Motor M will thus be rotated in a direction to further close valve $N^1$ which movement is terminated by the engagement of block $MS^1$ with member $MSh^1$. During this movement, contact $Ml^4$ will be brought into engagement with contact $Ml^2$.

When the rising trend of the condition is checked and is stationary but with the value of the condition still appreciably high, it is desirable to continue the appreciably decreased valve opening and with this condition, member E will again be deflected over its path $H^1$ resulting in no change in the position of valve $N^1$.

When the condition commences to fall but is still appreciably high, the member E will be deflected over its path H in which each of the switches will be in its forward position. A circuit will therefore be completed from conductor LC, switch $C^0$, conductor CB, switch $B^0$, conductor BD, switch $D^0$, conductor DA, switch $A^0$, conductor $Ah$ to member $Ml^4$, contact $Ml^2$, conductor $Ml^3$, field $Ml$, armature $Ma^1$ and line $LC^1$. Motor M will thereby be rotated to increase the opening of valve $N^1$ which movement will be terminated when member $Ml^4$ is separated from contact $Ml^2$ under the action of block $MS^1$. The position of valve $N^1$ when member $Ml^4$ is separated from contact $Ml^2$ in its opening movement is the same as the position of the valve when member $MSh$ is separated from contact $Mh^1$ in the closing movement previously described. The circuit previously traced, resulting from deflection of member E over its path H, differs from the last mentioned circuit in that in the former circuit the field $Mh$ of motor M was energized because the valve $N^1$ then occupied a position which required a closing operation to obtain the desired opening while in the latter, the field $Ml$ was energized because an opening valve movement was required to obtain the proper position.

If the trend of the condition is thus checked and is stationary but the value of the condition is still slightly high, member E will be again deflected over its path H, completing a circuit as in the last mentioned condition whereby valve $N^1$ will be in a position somewhat less open than at its normal position.

When the condition, as a result of the decreased valve opening, falls, with the condition only slightly above its normal value, the member E will be deflected over its mid or neutral path N in which switch $A^0$ is actuated to its mid position and each of switches $B^0$ and $C^0$ is maintained in its forward position. With this condition a circuit for motor M will be completed from line LC to switch $C^0$, conductor CB, switch $B^0$, conductor BD, switch $D^0$, conductor DA, to the mid contact of switch $A^0$, conductor AN to member MSA, contact $Ml^1$, conductor $Ml^3$, field $Ml$ of motor M, armature $Ma^1$ and line $LC^1$. The latter movement will be terminated when member MSA is separated from contact $Ml^1$ by block $MS^1$ which will leave valve $N^1$ in its normal position corresponding to the position which it occupies as a result of a low and rising condition as previously described. The circuit just described resulting from deflection of member E over path N due to a high and falling condition differs from the circuit previously traced resulting from deflection of member E over path N due to a low and rising condition in that in the previously traced circuit, the field $Ml$ had been energized and energization of field $Mh$ was necessary to return the valve $N^1$ to its normal position while, in the condition just described, the field $Mh$ had been energized and energization of field $Ml$ was necessary to return the valve $N^1$ to its normal position.

As the value of the condition decreases to its normal value and at that time the trend is stationary, member E will be again deflected over its neutral path as previously described whereby valve $N^1$ is maintained in its neutral position.

If a falling trend of the condition occurs while the value of the condition is normal, the member E will be deflected over its path L in which switch $A^0$ will be moved to its backward position and each of switches $B^0$ and $C^0$ will be maintained in its forward position. A circuit will thus be completed from line LC to switch $C^0$, conductor CB, switch $B^0$, conductor BD, switch $D^0$, conductor DA, switch $A^0$ and conductor Al to member MSl, contact Ml, conductor $Ml^3$, field Ml, armature $Ma^1$ to line $LC^1$. Motor M will thereby rotate valve $N^1$ in the opening direction until the operation is terminated by engagement of block $MS^1$ with member MSl. This position of valve $N^1$ corresponds to the previously described position of that valve occurring upon an appreciably low but rising condition. The previously described circuit resulting in this position of the valve $N^1$, differs from the circuit just described in that in the former it was necessary to energize the field Mh in order to give the valve $N^1$ a closing movement from its then wider open position as the furnace was heating up, while in the latter circuit it was necessary to energize the field M to give the valve $N^1$ an opening movement from its then normal open position.

If the falling trend of the condition is checked and is then stationary but the condition is slightly low, the member E will again be deflected over its path L resulting in again completing the circuit just described and the valve $N^1$ will be maintained in a position opened somewhat more than the normal amount.

A further falling trend of the condition with the value of the condition slightly below normal, will result in deflection of the member E over its path $L^1$ and a consequent movement of the switch $A^0$ to its backward position and maintenance of the switches $A^0$ and $B^0$ in their backward and forward positions respectively, as shown in Fig. 7. A circuit for the motor M will thus be completed which is identical to the circuit first described in which the motor M is energized to move the valve $N^1$ to its maximum open position which is terminated by the engagement of block $MS^1$ with the contact $MSl^1$.

Although the various circuits for the motor M were described in sequence as they would occur with the stated conditions, it will be understood without specific reference thereto, that the circuits may be completed in any sequence as the various conditions dictate. As an example, if the conditions were such that the member E were deflected over its path $H^1$ which would occur when the condition were high, and rising, the motor M would be energized to rotate the valve $N^1$ to its maximum position in the closed direction. If the trend of the condition should suddenly reverse and fall, member E would be deflected over path N and the motor M would be operated in a direction and by an amount to operate valve $N^1$ directly to its normal position N, without stopping at its intermediate position H.

The switch $D^0$, included in certain of the above traced circuits, is closed throughout the major portion of each cycle of the control mechanism by means of cam $12A^1$, fixed to shaft 12A. Shaft 12A as seen in Fig. 3 is geared to shaft 12 with an even gear ratio so as to rotate cam $12A^1$ once during each rotation of shaft 12 and thereby once in each control cycle. Switch $D^0$ is carried by bracket $D^1$ pivoted at $D^3$ and provided with roller $D^2$, the latter of which engages the edge of cam $12A^1$ whereby switch $D^0$ is tilted clockwise to its off position, for a short period, once in each rotation of cam $12A^1$. The portion of the cycle during which switch $D^0$ is permitted to turn to its off position is the portion of the cycle when member E is being moved to the left in Fig. 4 in its switch actuating movement so that no erroneous circuit connections can be made during the movement of switch $A^0$, $B^0$ or $C^0$ to a new position.

Although we have illustrated apparatus for producing a combinative control action resulting from two components, we may readily convert the apparatus so that it produces a control in accordance with only one component. This end may be attained by removing pin $Q^1$ from its location on lever Q shown in Fig. 3 and screwing the pin in an alternate threaded hole $QA^1$ on member Q. Hole $QA^1$, as will be clear from Fig. 3, is so disposed that when pin $Q^1$ is inserted therein, the latter will be adapted to engage the top edge of the instrument side plate upon clockwise movement of member Q into its Fig 3 position. The angular position in which lever Q is held when pin $Q^1$ is thus engaged corresponds to the mid or neutral position of its three operative positions. It will be clear therefore that not only is the member 150 rendered inoperative by removal of pin $Q^1$ from its Fig. 3 position but the proper functioning of the magnitude component is insured by placing pin $Q^1$ in hole $QA^1$ to predetermine a neutral position of member Q in each control operation.

Similarly, the magnitude component may be readily eliminated and the instrument made solely responsive to the existing position of the member 150 by moving the pin $C^4$ from the position shown in Fig. 3 to the hole $CA^4$ provided in the member $C^1$. When so moved the pin $C^4$ is adapted to contact the top edge of the instrument side plate when the member $C^1$ is moved clockwise into the position shown in Fig. 3, in which position the member S is held in its mid or neutral position. In order that the steps aH and $aH^1$ of the part A are rendered inoperative the detachable step piece a carrying the steps is removed whereby the control table A is rendered entirely inoperative. With the table A so modified the normal rising movements of the member $C^1$ under the action of the cam edge $O^6$ of the link $O^5$ is attained by means of the ledge $OA^6$ of the link $O^5$ which is adapted to contact the pin $C^4$ when the latter is in the hole $CA^4$.

In Fig. 8 is illustrated the mechanism of Figs. 1-6 adapted to control an electrical furnace in which a transformer $NA^1$ is arranged to supply heating current to a furnace, not shown, to which the instrument of Figs. 1-6 is responsive. The instrument proper for controlling the circuit of Fig. 8, may be identical in all respects to that described in connection with Fig. 6 but the circuit connections of and apparatus associated with switches $D^0$, $B^0$, $C^0$ and new switch AA is somewhat different. Switch AA may be identical to switches $B^0$ and $C^0$ differing from switch $A^0$ of Fig. 7 only in that switch AA has no center contact so that it is open circuited in its mid position. Switches $B^0$ and $C^0$ in Fig. 8 act as single pole switches.

In general, the manner of controlling the electrical current input to the furnace in Fig. 8 comprises adjusting the current supply to a reactor $NA^2$ placed between the primary and secondary windings of transformer $NA^1$. The current adjusting means for reactor $NA^2$ includes a motor driven rheostat R, two automatically controlled resistors RL and RH and manually adjustable resistors RT, $RT^1$ and RM all in circuit with said reactor across a direct current control supply line RD–RD¹.

Except for the sensitivity resistor RT¹ later described, the resistors referred to are included in a single series circuit which may be traced from DC line conductor RD to resistor RH, conductor RD², resistor RL, conductor RD³, resistor RM, reactor NA², conductor RD⁴, contact RD⁵, resistor R, conductor RD⁶, resistor RT, conductor RD⁷ to the opposite line conductor RD¹. Whether resistors RH and RL are in circuit and the amount of resistance R in circuit depends upon the positions of switches D⁰, AA, B⁰ and C⁰ whereby the value of the current in the reactor circuit is governed. Switches D⁰ and AA control a reversible electric motor r for positioning contact RD⁵ of resistor R, and resistors RH and RL are cut in and out by switches B⁰ and C⁰ respectively.

When the member E is deflected over its neutral path N as it will be deflected with a normal furnace temperature and a stationary trend or with a slightly low and rising condition or a slightly high and falling condition, the switches AA, B⁰ and C⁰ will be actuated to the positions shown in Fig. 8. As shown in Fig. 8, switch AA is open so that no control action results therefrom but switch B⁰ is in a position to shunt resistor RH from the reactor circuit. The circuit thus completed proceeds from line RD to conductor CH, switch B⁰ then closed, conductor CH¹, resistor RL, conductor RD³, resistor RM, reactor NA², conductor RD⁴, contact RD⁵, resistor R, conductor RD⁶, resistor RT, conductor RD⁷ and line RD¹ whereby a current exists in the reactor circuit which determines a current supply to the furnace calculated to maintain the latter at a normal temperature value. The normal value of the current may be varied by manual adjustment of resistor RM.

A slight rise in temperature in the furnace which will result in deflection of member E over its path H will not change the positions of switches B⁰ and C⁰ but will tilt switch AA to its forward position in which a circuit will be closed from a. c. supply circuit conductor RC to switch D⁰, conductor DA, switch AA, conductor RCH, field rH of motor r, conductor RC³ and opposite line conductor RC¹. Motor r will thus be energized to turn contact RD⁵ counterclockwise increasing the amount of resistor R in series with reactor NA² and thereby decreasing the current in the reactor circuit and decreasing the current supplied to the furnace. The amount of movement imparted to contact RD⁵ by energization of motor r may be governed by the gearing therebetween or, as will be clear from the description following of Fig. 9, an interrupter may be inserted in the energizing circuit for motor r to govern the running time of the latter. As shown in Fig. 8 motor r will run for practically the entire cycle with switch AA closed and switch D⁰ actuated as described in connection with Figs. 1–6.

With a high temperature condition such as to result in a deflection of member E over its path H¹, switch AA will again be tilted to its forward position in which motor r is energized and switch C⁰ will remain in its forward position but switch B⁰ will be tilted to its back position. In the back position of switch B⁰ the connection between conductors CH and CH¹ is interrupted throwing resistor RH into the reactor circuit to appreciably decrease the current in the latter thereby appreciably decreasing the heat supply to the furnace. It will be understood that as long as the condition remains off normal, the contact RD⁵ will be moved in a direction tending to restore the condition so that the collective correction effected by motor r will be a function of the length of time during which the condition is departed and is floating in the sense that the sum of the corrections added by motor r as the condition is departing, will equal the sum of the corrections subtracted by the motor as the condition is returning, only if the time of departure is equal to the time of return.

On a fall below normal of the furnace condition such that member E is deflected over path L, switch AA will be tilted in a direction to close an energizing circuit for motor r from conductor RC, switch D⁰, conductor DA, switch AA, conductor RCL, to field rL of motor r, and line conductor RC¹ to turn contact RD⁵ clockwise and decrease the resistor R in the reactor circuit and increase the heat supply to the furnace. Switches B⁰ and C⁰ will then be in their front positions of Fig. 8 in which resistor RH is out of circuit and resistor RL is in circuit. The resistances in the reactor circuit will therefore differ from normal only by the amount removed through the operation of motor r.

A further fall in temperature resulting in deflection of member E over path L¹ in which switch AA is maintained in a position to energize field rL, switch B⁰ is maintained in its forward position and switch C⁰ is actuated to its back position; will complete a shunt circuit around both resistors RL and RH. This circuit, from line RD to conductors CH, and CH¹, switch C⁰, conductors CHL and RD³, resistor RM, reactor NA², conductor RD⁴, contact RD⁵, resistor R, conductor RD⁶, resistor RT and conductor RD⁷ to line RD¹ is the lowest resistance path provided in which the maximum current supply to the furnace is permitted to flow in the circuits above traced.

The portion of the resistor R not in the series circuits above traced is connected at its free end by conductor RD⁸ to member RT³ in contact with resistor RT¹ and the latter is connected by means of conductor RD⁹ to line RD thus forming a circuit in parallel with the branch circuit including resistors RH, RL, RM and reactor NA². Contact RT³ of resistor RT¹ and contact RT² of resistor RT are mechanically connected and are manually adjustable together, so that the portion of each resistance in circuit at any time is proportional By varying the portion of resistors RT and RT¹ in circuit, the extent of reactor current change for a given movement of motor r is determined and by virtue of the mechanical coupling between resistors RT and RT¹ the symmetry of the circuit is preserved so that a given movement of contact RD⁵, in any portion of its range of movement, will result in a given reactor current change.

Figure 3A:
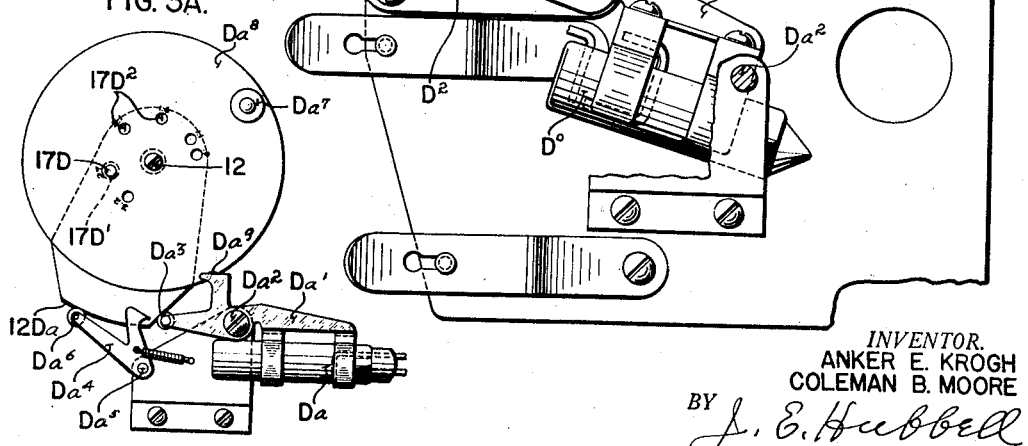
Fig. 3A is an elevation of an interrupter arrangement which may be added to the apparatus shown in Fig. 3.

In Fig. 9 is shown the control instrument adapted for the control of a two motor mechanism. The only modification made in the apparatus of Figs. 1–6, to adapt that mechanism to the control circuit of Fig. 9 is the addition of an interruptor mechanism corresponding generally to the device for controlling switch D⁰ of Fig. 3 but differing from the latter in the operation timing as shown in Fig. 3A. A switch Da, which may be identical to switch D⁰, is mounted on bracket Da¹ pivoted at Da² and having a pin Da³ adapted to be engaged by a latch piece Da⁴. Latch Da⁴ pivoted to the instrument side plate at Da⁵ is spring urged in a direction to hook over pin Da³ to hold bracket Da¹ in the off position but once in each rotation of shaft 12, a cam piece 12Da fastened thereto engages arm Da⁶ of latch $Da^4$ permitting bracket $Da^{11}$ to turn clockwise under the action of gravity into its on position. Subsequently a wiping roller $Da^7$, fixed to disc $Da^8$, the latter of which is fixed to shaft 12, engages edge $Da^9$ of bracket $Da^1$ to turn the latter to its off position in which position it is held by latch $Da^4$ until the latter is again released by cam 12Da. The energizing period between the release of bracket $Da^1$ and the latching of the latter is preferably regulatable by means of the manual adjustment of disc $Da^8$ with respect to cam piece 12Da. The relation of cam 12Da and disc $Da^8$ is fixed for a given adjustment by the pin and hole connection comprising a pin 17D fixed to cam 17, a hole $17D^1$ in cam 12Da and a series of holes $17D^2$ in disc $Da^8$. Holes $17D^2$ are designated as .9, 1.1, 1.6, 2.1, 2.7 and 3.2 representing the number of seconds, in a total cycle of 3.6 seconds, during which switch Da is closed.

Switches $A^0$, $B^0$, $C^0$ and $D^0$ of Fig. 9 are identical to the similarly identified switches of Fig. 6 the switches $B^0$ and $C^0$ acting as single pole switches as in Fig. 8. Switch AA of Fig. 9 is identical to switch AA of Fig. 8 and its function in Fig. 9 in connection with the interruptor provisions of switch Da and selection provisions of switch $A^0$ is quite as well adaptable to Fig. 8 as will hereinafter appear. Switches $A^0$ and AA are mounted together on bracket $hA$. Motors Ma and Mb of Fig. 8 which replace motor M of Fig. 6, are adapted to jointly control parts MNa, Na, and $Na^1$ corresponding to parts MN, N and $N^1$ of Fig. 6. Motor Ma having reversing fields Mal and Mah is so geared to lever MNa that it imparts a slow movement to valve $Na^1$ when energized and motor Mb having reversing fields Mbh and Mbl is so geared to lever MNa that it will, when energized, impart a rapid movement to valve $Na^1$. The extent of movement in the opening and closing directions respectively of motor Ma is governed by limit switches Lal and Lah of a well known type. The extent of movement of motor Mb upon each energization is limited by switches Lbl and Lbh. At the termination of movement of motor Mb in either direction, the switch Lbl or Lbh then energized, will be opened and a contact, connected with a conductor. MbN, will be simultaneously brought into engagement with the other switch.

In operation, with a low condition of the furnace, whereupon member E is deflected over its path $L^1$, the various switches will be moved to the positions indicated in Fig. 9 energizing motors Ma and Mb as follows. A circuit for motor Ma will be closed from line LC to switch $D^0$, conductors DC switch $C^0$, conductors CL and AAL, switch Lal, field MaL of motor Ma, armature $Ma^2$ and opposite line $LC^1$. Motor Ma will thus be energized for a complete cycle, terminated by the opening of interruptor switch $D^0$ to move valve N in the opening direction. A circuit for motor Mb will be closed from line LC to switch $D^0$, conductors DC and DA, switch $A^0$, conductor AL, switch Lbl, field Mbl, armature $Mb^1$ and line $LC^1$. Motor Mb will thus be energized until limit switch Lbl is actuated as a result of rotation of motor Mb which will occur before interruptor switch $D^0$ is opened.

Upon a rise in the furnace condition whereby member E is deflected over its path L, switches $A^0$, AA, and $B^0$ will be left in the positions of Fig. 9 but switch $C^0$ will be turned to its forward position. The energizing circuit just traced for motor Mb will again be completed but that circuit is then open at limit switch Lbl, and motor Mb is in its furthermost open position so that no further energization of motor Mb will occur when member E is deflected over its path L after an immediately preceding deflection over path $L^1$. The previously described energizing circuit for field Mal having been broken by the tilting of switch $C^0$, motor Ma is energized over a circuit from line LC, to switch $D^0$, conductor DDa, switch Da, conductor DAA, switch AA, conductor AAL, field Mal, armature $Ma^2$ and line $LC^1$. Motor Ma will thus be energized in the opening direction until the circuit is broken by the opening of switch Da under the cam action previously described, the running period being less than the running period terminated by the opening of switch $D^0$ in the circuit previously traced.

From the foregoing it will be clear that motor Ma will be given a longer or shorter movement in the closing direction as member E is deflected over paths $L^1$ and L respectively and motor Mb will be given a movement to a fixed limit upon deflection of member E over either path $L^1$ or L unless the motor Mb is already at said limit.

When the furnace conditions are so balanced at normal that member E is deflected over its neutral path N, switches $A^0$ and AA will be moved to their neutral or mid position but no change will occur in the positions of switches $B^0$ and $C^0$ from their last mentioned positions. Switches AA and $C^0$ being open, no energizing circuits for motor Ma are completed and the latter is left in the position to which it was last adjusted. The movement of switch $A^0$ to its mid position connects the mid point thereof, to which conductor MbN is connected, to switch blade Lbh which is then in connection with conductor MbN due to the opening of switch Lbl on the previous energization of field Mbl, and the field Mbh will be energized over a circuit from line LC, switch $D^0$, conductor DC, conductor DA, switch $A^0$, conductor MbN, switch Lbh to field Mbh, armature $Mb^1$ and line $LC^1$. Motor Mb thus energized will rotate in the closing direction until switch Lbh is separated from conductor MbN which will occur when motor has been returned to a mid-position in which switch Lbl will be permitted to reconnect to conductor AL.

Deflection of member E over its paths H or $H^1$ as a result of high furnace conditions will oppositely energize motors Ma and Mb through fields Mah and Mbh. Field Mah is under control of switches AA, $B^0$ and Da in a manner analogous to the manner in which field Mal is controlled by switches AA, $C^0$ and Da the circuits being completed to field Mah over conductors DB and AAH. Field Mbh is under control of switch $A^0$ over conductor AH as is field Mbl, and the restoration to neutral over conductor MbN after energization of field Mhb, is attained over switch Lbl and field Mbl in a manner analogous to the reverse movement described in connection with switch Lbh and conductor MbN.

It will be apparent from Figs. 6 and 9 that by replacing the motor Mb of Fig. 9 with motor M of Fig. 6 that five positions of the valve mechanism in combination with two degrees of step by step adjustment of the mechanism due to motor Ma might be obtained. The latter combination would consist in the addition of another pair of switches corresponding to switches $B^0$ and $C^0$ of Fig. 6 which together with switch $A^0$ of Fig. 9 would control motor M if the latter replaced motor Mb. The circuits for motor Ma would be unchanged.

As will be apparent to those skilled in the art, the control apparatus shown is characterized by the relative simplicity and effectiveness of the provisions for obtaining five position control. The apparatus is characterized, moreover, by the simplicity and effectiveness with which a broad range of control is had in joint response to the value and trend of change in the controlling condition. Thus, as is made clearly apparent in the above Table No. 1, when the trend is stationary, the control apparatus is adjusted into five different positions corresponding to five different values of the controlling condition. When the trend is rising, the apparatus will be adjusted into a different position for each of four of the condition values, from that into which the apparatus is adjusted when the trend is stationary, and when the trend is falling, for each of four values of the condition, the adjustment will be different from that obtained for the same value when the trend is stationary or rising.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. The combination with a potentiometric control instrument comprising a galvanometer deflecting in accordance with the variations in a controlled quantity, a member adjusted into one or another of a definite plurality of different predetermined positions in selective accordance with the galvanometer deflection into predetermined portions of its deflection range, an element adjusted into one or another of a definite plurality of different predetermined positions in selective accordance with predetermined different magnitudes of said quantity, of control instrumentalities adjustable to five different predetermined positions, and means actuated by the adjustments of said member and element into particular ones of their different predetermined positions for adjusting said control instrumentalities to a particular one or another of said five positions.

2. The combination in potentiometric control apparatus, of a galvanometer pointer deflecting in accordance with variations in the quantity measured, a member controlled by said galvanometer and selectively moved to one of three positions accordingly as the magnitude of the quantity is increasing, is stationary or is decreasing, an element deflecting under control of the galvanometer into different positions corresponding to different values of said quantity, a control motor means cooperating with said elements to operate said motor to one of three positions accordingly as the position of said element is at, below, or above a predetermined normal, means dependent upon the position of said member for nullifying the action of the first mentioned means when said member is in a position corresponding to an increasing value of the quantity and said part is below its predetermined normal position and said member is in a position corresponding to a decreasing value of the quantity and said element is above its predetermined normal position, and for actuating said motor to a fourth position when said member is in a position corresponding to an increasing value of said quantity and said element is above its predetermined normal position, and for actuating said control means to a fifth position when said member is in a position corresponding to a decreasing value of said quantity and said part is below its predetermined normal position.

3. The combination in potentiometric control apparatus, of a galvanometer pointer deflecting in accordance with variations in the quantity measured, a member controlled by said galvanometer and selectively moved to one of three positions accordingly as the magnitude of the quantity is increasing, is stationary or is decreasing, an element deflecting under control of the galvanometer into different positions corresponding to different values of said quantity, a control motor means cooperating with said elements to operate said motor to one of three positions accordingly as the position of said element is at, below, or above a predetermined normal, means dependent upon the position of said member for nullifying the action of the first mentioned means when said member is in a position corresponding to an increasing value of the quantity and said part is below its predetermined normal position and said member is in a position corresponding to a decreasing value of the quantity and said element is above its predetermined normal position, and for actuating said motor to a fourth position when said member is in a position corresponding to an increasing value of said quantity and said element is above its predetermined normal position, and for actuating said control means to a fifth position when said member is in a position corresponding to a decreasing value of said quantity and said part is below its predetermined normal position, and for actuating said control means to said fourth and fifth positions, respectively, when the position of said element is above or below said predetermined normal position by an amount greater than that required to actuate said motor from one to another of said three positions.

4. Control apparatus comprising in combination, a member adjusted to one or another of three positions accordingly as the trend of change in the value of a controlling condition is rising, stationary, or falling, a second member which is adjusted into a different position for each of a plurality of condition values including a normal value, and more than one value higher, and more than one value lower than said normal value, a control element, and means jointly controlled by the adjustment positions of said members for giving said element a different adjustment for each of said values when the trend is stationary, and, when the trend is rising, for giving said element an adjustment for each of said values, except the lowest one, which is the same as the adjustment given the element for the next lower value when the trend is stationary, and, when the trend is falling, for giving the element an adjustment for each of said values, except the highest one, which is the same as the adjustment given the element for the next higher value when the trend is stationary.

5. Control apparatus comprising in combination, a member adjusted to one or another of three positions accordingly as the trend of change in the value of a controlling condition is rising, stationary, or falling, a second member which is adjusted into a different position for each of five different condition values, a control element, and means jointly controlled by the adjustment positions of said members for giving said element a different adjustment for each of said values when the trend is stationary, and when the trend is rising, for giving said element an adjustment for each of said values, except the lowest one, which is the same as the adjustment given said element for the next lower value when the trend is stationary, and, when the trend is falling, for giving said element an adjustment for each of said values, except the highest one, which is the same as the adjustment given said element for the next higher value when the trend is stationary.

6. In a control instrument, a member adjusted into different positions in accordance with variations in one control condition, and comprising an engaging surface, a second member adjusted into different positions in accordance with variations in a second controlling condition, a control element having an engaging part and biased for movement in the direction for the engagement of said surface by said part, and a pin and slot connection between said control element and said second member, whereby the position of said element when its said part is in engagement with said engaging surface, is jointly dependent on the adjustments of both members.

7. In a control instrument, a member adjusted about a horizontal axis into different positions in accordance with variations in one control condition, and comprising an engaging surface, a second member adjusted angularly about a horizontal axis into different positions in accordance with variations in a second controlling condition, a control member having an engaging part and having a gravitational bias for movement in the direction for the engagement of said surface by said part, and a pin and slot connection between said control element and said second member permitting movement of said element in said direction relative to said second member, whereby the position of said element, when in engagement with said engaging surface, is jointly dependent on the adjustments of both members.

8. Control apparatus comprising in combination, a reversible control motor, a switch mechanism adjusted by said motor into different positions by movement of the motor into different positions, a plurality of control switches, an adjustable switch actuating member for operating the last mentioned switches in selective accordance with the adjustment of said member, means responsive to variations in a control condition for giving said member a plurality of adjustments greater in number than the number of said control switches including an intermediate adjustment and a plurality of adjustments at each side of, and differently displaced from said intermediate adjustment, and means including said switches and switch mechanism for energizing said motor for movement into different positions corresponding respectively to the different adjustments of said member.

9. Control apparatus comprising in combination, a reversible control motor, a switch mechanism adjusted by said motor into different positions by movement of the motor into different positions, a plurality of control switches, an adjustable switch actuating member for operating the last mentioned switches in selective accordance with the adjustment of said member, means responsive to variations in a control condition for giving said member a plurality of adjustments greater in number than the number of said control switches, and means including said switches and switch mechanism for energizing said motor for movement into different positions corresponding respectively to the different adjustments of said member.

10. In control apparatus, a reversible electric control motor, a limit switch mechanism comprising a movable member adjusted into different positions by movement of the motor into different positions along the range of movement of the latter, movable contacts carried by said movable member and adjusted by the movements of the latter, movable contacts suported independently of said member but engaged and adjusted by said member on movements of the latter into predetermined positions, stationary contacts, a plurality of switches, means for adjusting said switches into different positions in accordance with variations in a controlling condition, and motor energizing means including said switches and contacts adapted on the described adjustments to effect movements of said motor into a number of predetermined positions exceeding the number of said switches.

11. In control apparatus, a reversible electric control motor, a limit switch mechanism comprising a movable member adjusted into different positions by movement of the motor into a plurality of predetermined positions along the range of movement of the latter, movable contacts carried by said movable member and adjusted by the movements of the latter, movable contacts supported independently of said member but engaged and adjusted by said member on movements of the latter into predetermined positions, stationary contacts, a plurality of switches, means for adjusting said switches into different positions in accordance with variations in a controlling condition, and motor energizing means including said switches and contacts and adapted on the described adjustments to effect movements of said motor into said predetermined positions greater in number than the number of said control switches.

12. In a control instrument, an adjustable member having an engaging surface, means for adjusting said member into different positions in accordance with variations in one control condition, a second adjustable member, means for adjusting the latter into different positions in accordance with variations in a second controlling condition, a controlling element having an engaging part and biased for movement in the direction for the engagement of said surface by said part, a pin and slot connection between said control element and said second member, whereby when both of said means are operative and said part is in engagement with said engaging surface, the position of said element is jointly dependent on the variations in both of said conditions, and means for rendering either of the two first mentioned means inoperative without rendering the other inoperative, whereby the position of said element, when its said part is in engagement with said surface, may be made dependent of variations in either one of said conditions.

13. Control apparatus comprising in combination an electrical heater, means responsive to the temperature therein, means controlling the current supply to said heater comprising a circuit network including a plurality of fixed resistors adapted to be selectively shunted by said means in accordance with said temperature condition and a variable resistance adapted to be varied by said means in accordance with said temperature condition.

14. Control apparatus for an electrical heater comprising a circuit network, including a plurality of fixed resistors and a variable resistor, and means responsive to the temperature of said heater for controlling said network including a device responsive to a departure of said temperature from a predetermined value for moving said variable resistor in a direction to oppose said departure, and a device adapted to shunt one of said resistors from said circuit network upon a further departure of said temperature from said predetermined value.

15. Control apparatus for an electrical heater comprising a circuit network including a plurality of fixed resistors and a variable resistor, means responsive to the temperature of said heater for controlling said network including an element responsive to the trend of said temperature, an element responsive to the magnitude of said temperature and means jointly controlled by said elements and actuated to a plurality of positions including a neutral position, a high position, a higher position, a low position and a lower position corresponding to the combinative effects of the magnitude and the trend of said condition, means responsive to said high and low conditions respectively for actuating said variable resistor, and means responsive to said higher and lower conditions respectively to selectively shunt said fixed resistors.

16. Control apparatus comprising in combination, an adjustable control device, a plurality of control switches movable relative to one another, an adjustable switch actuating member for adjusting said switches into different positions relative to one another in selective accordance with the adjustment of said member, means responsive to variations in a control condition for giving said member an intermediate adjustment and a plurality of different adjustments at each side of its neutral position, and circuit connections between said switches and devices for adjusting said device into a plurality of different conditions respectively corresponding to the different adjustments of said member.

17. Control apparatus comprising in combination, an adjustable control device, a plurality of control switches movable relative to one another, an adjustable switch actuating member for adjusting said switches into different positions relative to another in selective accordance with the adjustment of said member, means responsive to variations in a control condition for giving said member an intermediate adjustment and a plurality of different adjustments at each side of its intermediate adjustment, and circuit connections between said switches and devices for adjusting said device into a neutral condition and into a plurality of different conditions at each side of its neutral condition, accordingly, as said member is given one or another of its different adjustments.

18. Control apparatus comprising in combination, a reversible electrical motor, four pairs of switch contacts adjustable into five different relative positions for selectively controlling said motor in opposite directions for two different periods of time, a control instrumentality responsive to a condition and including means for adjusting one pair of said contacts into the closed position thereof with one extreme value of said condition and adjusting the last mentioned contacts into the off position with all other values of said condition, adjusting another pair of said contacts into closed position with the other extreme value of said condition and adjusting the last mentioned contacts into open position with all other values of said condition, adjusting a third pair of contacts into closed position with a value of said condition intermediate the first mentioned extreme value of said condition and the normal value of the latter, adjusting the fourth pair of contacts into closed position with a value of said condition intermediate the second mentioned extreme value of said condition and the normal value thereof, and interruptor switch means in series with said contacts for interrupting the circuit for a period, second interruptor switch means in series with the third and fourth mentioned contacts only for closing the circuit through the latter for a period which is different from the closed period through the first and second mentioned pairs of contacts.

19. Control apparatus comprising in combination a reversible electrical motor, a circuit network including a path over which said motor is energized to rotate in one direction for a period, a second path over which said motor is energized to rotate in the opposite direction for substantially the same period, a third path over which said motor is energized to rotate in the first mentioned direction for a period shorter than the first mentioned period, and a fourth path over which said motor is energized to rotate in the second mentioned direction for a period shorter than the second mentioned period, a control instrumentality including an element deflecting in response to a condition to be controlled from a normal position thereof to an extreme position in one direction or the other and to first and second intermediate positions between said normal and extreme positions in either direction, mercury switch control means including four pairs of contacts for controlling said motor over said circuit network, relay mechanism, interposed between said element and means, for adjusting the latter into a position in which one of said pairs of contacts is closed to complete the first mentioned path when said element is in one extreme position, adjusting another pair of said contacts into closed position to complete the second mentioned path when said element is in its opposite extreme position, adjusting a third pair of contacts into closed position to complete the third mentioned path when said element is in the first intermediate position, adjusting a fourth pair of contacts into closed position to complete the fourth mentioned path when the said element is in the second intermediate position, and means for maintaining the mercury switch means in the adjusted position thereof corresponding to a given position of said element until readjusted by said mechanism in response to the movement of said element to another position thereof.

20. Control apparatus including a deflecting meter element, a reversible electrical motor, mercury switch control means for said motor including four pairs of contacts, a circuit network including said contacts and motor and first, second, third and fourth paths over which said motor is energized including respectively first, second, third and fourth pairs of contacts, pivoted means for controlling the tilting of said mercury switch means, mechanical relay means including a pivoted element adapted to cooperate with said pivoted means, cam means giving said pivoted means and element relative reciprocatory motion, and selective means governing the cooperation of said pivoted means and element to tilt said mercury switch means into and maintain in one of five relative positions accordingly as said meter element is in a slightly high position, a higher position, a slightly low position, or a low position, said contacts being so arranged and disposed that one pair thereof is closed in one of five relative positions of said mercury switch means, corresponding to said higher position of said element, but is open in all other of said relative positions, a second pair thereof is closed in a second of five relative positions of said mercury switch means, corresponding to said lower position of said element but is open in all other of said relative positions, a third pair thereof is closed in a third of five relative positions of said mercury switch means, corresponding to said slightly high position of said element, and a fourth pair thereof is closed in a fourth of five relative positions of said mercury switch means, corresponding to said slightly low position of said element.

21. Control apparatus including a deflecting meter element, a reversible electrical motor, mercury switch control means for said motor including four pairs of contacts, a circuit network including said contacts and motor and first, second, third and fourth paths over which said motor is energized, including respectively first, second, third and fourth pairs of said contacts, pivoted means for controlling the tilting of said mercury switch means, mechanical relay means including a pivoted element adapted to cooperate with said pivoted means, cam means for oscillating said element toward and away from said pivoted means and selective means for moving said element transversely of the general path imparted to it by said cam means to direct said element over one of five paths selectively dependent upon the position of said element with respect to a predetermined normal position of the latter, the engaging portions of said pivoted means and element being so configured as to adjust said pivoted means into one of five positions depending upon the selected path of said element, said pivoted means and mercury switch means being so disposed and related that one of said pairs of contacts will be closed in one extreme position of said pivoted means, another of said pairs of contacts will be closed in the other extreme position of said pivoted means, and the third and fourth pairs of contacts will be closed respectively in the positions of said means intermediate the mid position and said extreme positions respectively.

22. Control apparatus including a deflecting meter element, a reversible electrical motor, mercury switch control means for said motor including seven pairs of contacts, a circuit network including said contacts and motor and first, second, third and fourth paths over which the first mentioned motor is energized including respectively first, second, third and fourth pairs of said contacts, to rotate the first mentioned motor in one direction or the other respectively for a period, or is energized to rotate in one direction or the other respectively for a period which is shorter than the first mentioned period, and fifth, sixth and seventh paths over which the second mentioned motor is energized including respectively fifth, sixth, and seventh pairs of said contacts, to rotate the second mentioned motor to one of three positions selectively dependent upon the pair of said fifth-, sixth or seventh contacts closed, pivoted means for controlling the tilting of said mercury switch means, mechanical relay means including a pivoted element adapted to cooperate with said pivoted means, cam means giving said pivoted means and element relative reciprocatory motion, and selective means governing the cooperation of said pivoted means and element to tilt said mercury switch means into and maintain in one of five relative positions accordingly as said motor element is in a slightly high position, a higher position, a slightly low position or a low position, said contacts being so arranged and disposed so that one pair of the first mentioned five thereof is closed in one of five relative positions of said mercury switches, corresponding to said higher position of said element but is open in all other of said relative positions, a second pair of the first mentioned five thereof is closed in a second of five relative positions of said mercury switch means, corresponding to said low position of said element but is open in all other of said relative positions, a third pair of the first mentioned five thereof is closed in a third of five relative positions of said mercury switch means corresponding to said slightly high position of said element, and a fourth pair of the first mentioned five thereof is closed in a fourth of five relative positions of said mercury switch means, corresponding to said slightly low position of said element, the sixth pair thereof is closed in one of five relative positions of said mercury switch means corresponding to a position of said element intermediate said slightly high and slightly low positions and one or the other of the fifth and seventh pairs of said contacts is closed in all positions of said mercury switch means except the last mentioned position.

23. The combination in a control instrument having an element deflecting in accordance with the value of a variable condition of a plurality of pivoted mercury control switches each adjustable into a maximum of three different angular positions about a common pivot, an electrical reversible control motor adjustable into more than three different predetermined positions corresponding to an equal number of positions of said element and means interposed between said element and control switches for variably adjusting the latter into positions relative to one another for energizing said motor to assume one of its said positions in accordance with the corresponding position of said element.

24. The combination in a control instrument having an element deflecting in accordance with the value of a variable condition, of a three-positional mercury control switch and two two-positional mercury control switches pivoted on a common axis independently adjustable thereabout, an electrical reversible control motor having five positions corresponding to an equal number of positions of said element and means interposed between said element and switches for actuating the first mentioned switch to its mid position or to one or the other of the two remaining positions accordingly as said element occupies a predetermined position or is above or below that position respectively, actuating one of said two positional switches to its closed position in one direction and the other of said two positional control switches to its opposite position in the opposite direction when said condition exceeds a second predetermined value and actuating the said two-positional switches to their opposite positions respectively when said condition falls below a third predetermined condition to thereby rotate said motor into its mid position when the three positional switch is in its mid position, to rotate said motor into different positions, respectively displaced in opposite directions from said mid position when said three positional switch is tilted from its mid position in one position and said two positional switches are in the first mentioned relation, and to rotate said motor to two different positions respectively displaced in opposite directions from said mid position when said three position switch is tilted from its mid position in the other direction and said two position switches are in the second mentioned relation.

25. In combination with control apparatus including a member responsive to the trend of the controlled condition and occupying one position responsive to a stationary condition and another position responsive to a trend of the condition, and a member responsive to the magnitude of said condition, means for rendering the first mentioned member inoperative by causing the latter to assume said one position.

ANKER E. KROGH.
COLEMAN B. MOORE.